US010036217B2

(12) United States Patent
Munisteri

(10) Patent No.: US 10,036,217 B2
(45) Date of Patent: Jul. 31, 2018

(54) SEPARATION OF DRILLING FLUID

(71) Applicant: MBJ Water Partners, Houston, TX (US)

(72) Inventor: Joseph G. Munisteri, Houston, TX (US)

(73) Assignee: MBL Partners, LLC, Houston, TX (US)

( * ) Notice: Subject to any disclaimer, the term of this patent is extended or adjusted under 35 U.S.C. 154(b) by 0 days.

(21) Appl. No.: 14/734,851

(22) Filed: Jun. 9, 2015

(65) Prior Publication Data

US 2015/0275601 A1  Oct. 1, 2015

Related U.S. Application Data

(63) Continuation-in-part of application No. 14/229,320, filed on Mar. 28, 2014, now Pat. No. 9,896,918,
(Continued)

(51) Int. Cl.
| | |
|---|---|
| *C02F 1/00* | (2006.01) |
| *E21B 21/06* | (2006.01) |
| *B01D 21/34* | (2006.01) |
| *C02F 1/48* | (2006.01) |
| *E21B 43/18* | (2006.01) |
| *E21B 43/26* | (2006.01) |
| *E21B 43/40* | (2006.01) |
| *B01D 21/00* | (2006.01) |
| *B01D 57/02* | (2006.01) |

(Continued)

(52) U.S. Cl.
CPC ........ *E21B 21/065* (2013.01); *B01D 21/0033* (2013.01); *B01D 21/34* (2013.01); *C02F 1/487* (2013.01); *E21B 21/066* (2013.01); *E21B 43/18* (2013.01); *E21B 43/26* (2013.01); *E21B 43/40* (2013.01); *B01D 57/02* (2013.01); *C02F 2103/10* (2013.01); *C02F 2103/365* (2013.01); *C02F 2303/04* (2013.01); *C02F 2303/22* (2013.01)

(58) Field of Classification Search
None
See application file for complete search history.

(56) References Cited

U.S. PATENT DOCUMENTS

| | | | |
|---|---|---|---|
| 3,433,312 A | 3/1969 | Burdyn et al. | |
| 3,616,173 A * | 10/1971 | Green | E04B 1/94 |
| | | | 106/711 |

(Continued)

FOREIGN PATENT DOCUMENTS

| | | |
|---|---|---|
| CA | 2694811 A1 | 9/2011 |
| CN | 203044482 U | 7/2013 |

(Continued)

OTHER PUBLICATIONS

Boyd, Danny, Solutions Improve Water Management, The American Oil and Gas Reporter, Mar. 2015, 2 pages, Houston, USA.
(Continued)

*Primary Examiner* — Richard C Gurtowski
(74) *Attorney, Agent, or Firm* — Karen B. Tripp

(57) ABSTRACT

A method and apparatus for separating the constituents of a drilling fluid into two or more groups based on particulate size and specific gravity in a continuous flow process.

12 Claims, 3 Drawing Sheets

Related U.S. Application Data which is a continuation-in-part of application No. 14/095,346, filed on Dec. 3, 2013, now abandoned, which is a continuation of application No. 13/832,759, filed on Mar. 15, 2013, now abandoned, which is a continuation-in-part of application No. 13/594,497, filed on Aug. 24, 2012, now Pat. No. 8,424,784.

(60) Provisional application No. 62/009,894, filed on Jun. 9, 2014, provisional application No. 61/676,628, filed on Jul. 27, 2012.

(51) Int. Cl.
C02F 103/10 (2006.01)
C02F 103/36 (2006.01)

(56) References Cited

U.S. PATENT DOCUMENTS

| | | | |
|---|---|---|---|
| 3,637,031 A | 1/1972 | Hull et al. | |
| 3,717,255 A | 2/1973 | Rowland et al. | |
| 4,039,459 A | 8/1977 | Fischer et al. | |
| 4,090,523 A | 5/1978 | Kelly et al. | |
| 4,208,285 A | 6/1980 | Sample | |
| 4,289,610 A * | 9/1981 | Erickson | B04B 5/10 |
| | | | 209/18 |
| 4,588,445 A * | 5/1986 | Oliver | C09K 8/12 |
| | | | 134/22.14 |
| 4,588,509 A | 5/1986 | Hyde et al. | |
| 4,696,353 A * | 9/1987 | Elmquist | B01D 35/20 |
| | | | 175/206 |
| 4,747,961 A | 5/1988 | Beer et al. | |
| 4,751,887 A | 6/1988 | Terry et al. | |
| 5,080,721 A | 1/1992 | Flanigan et al. | |
| 5,415,776 A * | 5/1995 | Homan | B01D 17/00 |
| | | | 175/206 |
| 5,814,230 A | 9/1998 | Willis et al. | |
| 5,857,522 A | 1/1999 | Bradfield et al. | |
| 5,858,237 A | 1/1999 | Hashimi et al. | |
| 5,900,137 A | 5/1999 | Homan | |
| 6,132,630 A | 10/2000 | Briant et al. | |
| 6,162,284 A | 12/2000 | Mitchell et al. | |
| 6,193,070 B1 | 2/2001 | Rowney et al. | |
| 6,250,473 B1 | 6/2001 | Golightley et al. | |
| 6,328,118 B1 | 12/2001 | Karigan et al. | |
| 6,681,874 B2 | 1/2004 | Risher et al. | |
| 7,144,516 B2 | 12/2006 | Smith | |
| 7,216,397 B1 * | 5/2007 | Tanner | A47L 11/34 |
| | | | 15/320 |
| 7,238,150 B2 | 7/2007 | Houwen | |
| 7,241,393 B2 | 7/2007 | Stoy | |
| 7,413,084 B2 | 8/2008 | Wegner et al. | |
| 7,568,535 B2 | 8/2009 | Larson et al. | |
| 7,763,166 B2 | 7/2010 | Cymerman et al. | |
| 7,886,850 B2 | 2/2011 | Burnett | |
| 8,074,738 B2 | 12/2011 | Mcdonald et al. | |
| 8,127,867 B1 | 3/2012 | Droke | |
| 8,137,550 B1 | 3/2012 | Moe | |
| 8,201,693 B2 | 6/2012 | Jan | |
| 8,282,838 B2 | 10/2012 | Billeaud | |
| 8,518,243 B2 | 8/2013 | Khan | |
| 2001/0039887 A1 * | 11/2001 | Reddoch | B30B 9/12 |
| | | | 100/117 |
| 2006/0083645 A1 | 4/2006 | Simmons | |
| 2008/0017594 A1 | 1/2008 | Sarshar et al. | |
| 2008/0169237 A1 | 7/2008 | Schrader et al. | |
| 2010/0064893 A1 | 3/2010 | Hopper | |
| 2010/0206732 A1 | 8/2010 | Hale | |
| 2011/0147087 A1 | 6/2011 | Eia | |
| 2011/0220418 A1 | 9/2011 | Clark et al. | |
| 2011/0266228 A1 | 11/2011 | Brown et al. | |
| 2012/0073932 A1 | 3/2012 | Burnett | |
| 2012/0187028 A1 * | 7/2012 | Mickler | B09B 3/00 |
| | | | 208/429 |
| 2013/0277113 A1 | 10/2013 | Murphy | |
| 2014/0027386 A1 | 1/2014 | Munisteri | |
| 2014/0083857 A1 | 3/2014 | Munisteri | |
| 2014/0209312 A1 | 7/2014 | Munisteri | |
| 2015/0152721 A1 | 6/2015 | Munisteri | |

FOREIGN PATENT DOCUMENTS

| | | |
|---|---|---|
| DE | 19902784 A1 | 7/2000 |
| EP | 0528067 A1 | 2/1993 |
| EP | 0936344 A2 | 8/1999 |
| EP | 2381238 A1 | 10/2011 |
| GB | 1359775 A | 7/1974 |
| WO | 1989009638 A1 | 10/1989 |
| WO | 2012051424 A2 | 4/2012 |
| WO | 2012131146 A1 | 10/2012 |
| WO | 2012146941 A1 | 11/2012 |
| WO | 2013075252 A1 | 5/2013 |
| WO | 2014018991 A3 | 1/2014 |

OTHER PUBLICATIONS

Publication of Argentina Patent Application No. P13 01 02683, Patent Bulletin No. 819, Mar. 11, 2015, 1 page.
File history of co-pending U.S. Appl. No. 14/338,827, filed Jul. 23, 2014, 2072 pages.
File history of co-pending U.S. Appl. No. 14/338,861, filed Jul. 23, 2014, 2174 pages.
File history of co-pending U.S. Appl. No. 14/229,320, filed Mar. 28, 2014, 828 pages.
File history of co-pending U.S. Appl. No. 14/619,747, filed Feb. 11, 2015, 1083 pages.
File history of co-pending U.S. Appl. No. 13/594,497, filed Aug. 24, 2012, 709 pages.
File history of co-pending U.S. Appl. No. 13/832,759, filed Mar. 18, 2013, 3020 pages.
File history of co-pending U.S. Appl. No. 14/095,346, filed Dec. 3, 2013, 2076 pages.
File history of co-pending PCT Application No. PCT/US14/41748, filed Jun. 10, 2014, 82 pages.
Dynamic cyclone improves solids separation, World Oil, Apr. 2004, Issue 4, pp. E-48.
Van Kemenade, Erik; Mondt, Eva; Hendriks, Toine; Verbeck, Paul, Liquid-phase separation with the rotational particle separator, Chemical Engineering and Technology, Nov. 2003, pp. 1176-1183.
Kennedy, John, L., Mud cleaner discards drilled solids, saves barite, Oil and Gas Journal, Issued Jan. 7, 1974, pp. 82-84, 89, 82.

* cited by examiner

SEPARATION OF DRILLING FLUID

CROSS-REFERENCE TO RELATED APPLICATIONS

This application claims priority to U.S. Provisional Application No. 62/009,894, filed Jun. 9, 2014. This application is a continuation in part of U.S. application Ser. No. 14/229,320, filed Mar. 28, 2014, which is a continuation in part of U.S. application Ser. No. 14/095,346, filed Dec. 3, 2013, which is a continuation of U.S. application Ser. No. 13/832,759, filed Mar. 15, 2013, which is a continuation in part of U.S. application Ser. No. 13/594,497 filed Aug. 24, 2012, now U.S. Pat. No. 8,424,784, issued Apr. 23, 2013, which claims priority to U.S. Provisional App. No. 61/676,628, filed Jul. 27, 2012.

BACKGROUND OF THE INVENTION

Over the years, many attempts were made to treat or reuse the cuttings from vertically driven oil wells in on shore field operations. The disposal of these oil-covered cuttings has always been a problem for drillers but most of time drillers were just putting them into pits and covering the pits up with earth. For oil wells that were drilled onshore, there was no single process that proved to be economically viable and the use of pits continued. However, for offshore drilling operations, the situation was entirely different.

A number of attempts were made to thermally treat the oil cuttings, in vertically mounted Herreshoff kilns but these attempts caused the opening and closing gates to become thermally distorted due to extensive temperature differentials and the cyclical nature of the operations. All of these various attempts ultimately failed and drillers were forced to put these oil-covered cuttings in containers and ship them to shore locations for disposal in pits. If these oil-covered cuttings were accidentally, allowed to be dumped at sea, they would create a surface film or sheen that would be very costly to recover or remove with pontoons or with absorbents.

For more than eighty years recovering Kerogene, with the use of oil-shale retorting, as a "Brute Force Process", has been practiced in Estonia and in Spain. As a result of this practice, mountains of spent shale or Nahcolites remain in these countries. In Rifle, Colo. TOSCO, (The Oil Shale Company) vertically configured demonstration plants were built in Rifle, Colo. and near Porto Allegre in Brazil. Both operations failed for the same differential temperature problems and TOSCO was sold to new investors. In the nineteen sixties and nineteen seventies Occidental oil, Exxon and others experimented with the underground recovery of kerogene as a transportation fuel. The whole program collapsed when the world price of crude oil dropped and the recovery of kerogene became uneconomical.

The reuse of water and the disposal of hydrocarbon coated drilling cuttings, both onshore, and more importantly, offshore, has always been an environmental problem for all companies in the oil and gas business. Onshore, the problem has been handled by the disposal of the cuttings by having pits which are then covered by dirt and then abandoned. Offshore the Problem could be more serious because if cuttings are allowed to drop in the water it leaves an oil residue or leaves a fine "sheen" on the surface of the water which has to be removed by using Pontoons or absorbents. The recovery of Barite and Bentonite materials, which are used in the operations both offshore and drilling onshore, requires mud mixtures that are valuable to a drilling company. The recovery of the water, which is used to carry these materials to the drill bit, can also be valuable in many arid areas in the world.

Therefore, an object of further examples is to economically address and satisfactorily resolve some of the major environmental concerns that are of industry-wide importance. Objects of still further examples are to eliminate the need for brine disposal wells, eliminate or minimize the need for pits, the recovery of all flow-back or produced water for reuse in subsequent hydraulic fracturing operations, and the recovery of drilling mud ingredients. Examples of the invention provide technically sound and economically viable solutions to many of the public safety issues that have concerned the industry.

SUMMARY OF EXAMPLES OF THE INVENTION

An example embodiment of the invention includes a method for separating particulates from drilling fluid in a vessel comprising passing the drilling fluid through a vessel, receiving drilling fluid into a first portion of the vessel, collecting a first particulate within a first portion of the vessel, wherein the first particulate has a first average specific gravity and a first average size, collecting a second particulate within a second portion of the vessel, wherein the second particulate has a second average specific gravity and a second average size, collecting a third particulate within a third portion of the vessel, wherein the third particulate has a third average specific gravity and a third average size, and removing, during said passing, drilling fluid from the vessel.

A variation of the embodiment may in include continuously removing the first particulate from the vessel during the said passing of the drilling fluid, continuously removing the second particulate from the vessel during the said passing of the drilling fluid continuously removing the third particulate from the vessel during the said passing of the drilling fluid, and/or continuously removing drilling fluid from the vessel during said passing.

A variation of the embodiment may in include venting gases from within the vessel, as needed, to maintain a constant pressure, or regulating the drilling fluid level height within the vessel using a level controller.

A variation of the embodiment may in include using a fluid height sensor in conjunction with a controller connected to a valve that opens and closes to allow make-up fluid to enter the vessel. A variation may include the make-up fluid being is at least partially composed of drilling fluid removed from the vessel. The embodiment may utilize at least a portion of the drilling fluid removed from the vessel in a drilling operation, utilize at least a portion of the first particulate removed from the vessel in a drilling operation, utilize at least a portion of the second particulate removed from the vessel in a drilling operation, or utilize at least a portion of the third particulate removed from the vessel in a drilling operation.

A variation of the embodiment may include blending at least a portion of the drilling fluid removed from the vessel with a second drilling fluid, blending at least a portion of the first particulate removed from the vessel with a second drilling fluid, blending at least a portion of the second particulate removed from the vessel with a second drilling fluid, and/or blending at least a portion of the third particulate removed from the vessel with a second drilling fluid.

A variation of the embodiment may include a first baffle controls flow from the first portion from the second portion and/or a second baffle controls flow from the second portion from the third portion. Additionally, the first particulate may be predominately composed of barite particulate. The second particulates may be predominately composed of cuttings from a drilling operation. The third particulate may be predominately composed of bentonite particulate.

A variation of the embodiment may further include treating a portion of the second particulate in a slagging rotary kiln. In another variation the first average specific gravity is larger than the second average specific gravity. Moreover, the first average specific gravity may be larger than the third average specific gravity. Additionally, the second average size may be is larger than the first average size. The second average size may be larger than the third average size.

Another embodiment of the current invention may be described as a method for separating particulate from drilling fluid in a continuous operation comprising, passing drilling fluid through a horizontal vessel, collecting a first particulate, a second particulate, and a third particulate, removing the collected first particulate, second particulate, and third particulate from the vessel, regulating the pressure within the vessel, regulating the drilling fluid height within the vessel, and passing the remaining drilling fluid out of the vessel.

A variation of the embodiment may include the first particulate being collected at the bottom of a first portion of the vessel. The first particulate may have a first average specific gravity and a first average size. The second particulate may be collected at the bottom of a second portion of the vessel. The second particulate may have a second average specific gravity and a second average size. The third particulate may be collected at the bottom of a third portion of the vessel. The third particulate may have a third average specific gravity and a third average size.

A variation of the embodiment may include receiving drilling fluid into a first portion of the vessel. A variation may include passing the drilling fluid through a first baffle, wherein the first defined baffle is in between the first portion of the vessel and a second portion of the vessel.

Another variation may also include passing the drilling fluid through a second defined baffle, wherein the second baffle is in between the second portion of the vessel and a third portion of the vessel. The first baffle may have a plurality of through holes of a first diameter and a first pitch. The second baffle may have a plurality of through holes of a second diameter and a second pitch. The first diameter may not equal the second diameter. The first pitch may not equal the second pitch.

A variation of the embodiments described may include regulating the pressure within the vessel using a sensor in conjunction with a controller that can open and close a vent adapted to relieve pressure within the vessel. Another variation may include regulating the drilling fluid height within the vessel using a sensor in conjunction with a controller that can open and close a valve connected to an inlet pipe adapted to introduce make-up fluid into the vessel.

A variation of the embodiments described may include the first particulate being predominately composed of barite particulate. The second particulates may be predominately composed of cuttings from a drilling operation. The third particulate may be predominately composed of bentonite particulate. A variation may include treating a portion of the second particulate in a kiln. The first average specific gravity may larger than the second average specific gravity. The first average specific gravity may be larger than the third average specific gravity. The second average size may be larger than the first average size. The second average size may be larger than the third average size.

Another embodiment of the invention is described as a system for separating particulate from drilling fluid in a horizontal vessel comprising a means for receiving a drilling fluid into the vessel, a means for receiving make up fluid into the vessel, a means for venting gas out of the vessel, a means for collecting particulates of a first average size and first specific gravity, and removing them from the vessel, a means for collecting particulates of a second average size and second specific gravity, and removing them from the vessel, a means for collecting particulates of a third average size and third specific gravity, and removing them from the vessel, and removing a portion of the drilling fluid from the vessel.

A variation of the embodiments described may include a means for collecting the first particulate includes a first portion of the vessel controls flow from the rest of the vessel by a first baffle. Moreover, the means for collecting the second particulate may include a second portion of the vessel controls flow from the first portion by the first baffle and from the rest of the vessel by a second baffle. A variation may include the means for collecting the third particulate including a third portion of the vessel separated from the rest of the vessel by the second baffle. Another variation of the embodiments may include the first baffle as a vertical plate containing a plurality of through holes with a first diameter and a first pitch. Another variation includes the second baffle having a vertical plate containing a plurality of through holes with a second diameter and a second pitch. Another variation of the embodiments may include the means for removing a portion of the drilling fluid from the vessel including a deflector adapted to direct the fluid flow downward and then upward into a fourth outlet pipe.

A variation of the embodiments may include the means for receiving a drilling fluid into the vessel including a first inlet pipe. Another option is to have the means for receiving make up fluid into the vessel include a second inlet pipe. The system may include a means for venting gas out of the vessel to include at least one vent cover adapted to release gas at a specific pressure threshold. The system with the means for collecting and removing the first particulate may be a first outlet pipe having a conical interface with the vessel. The system with the means for collecting and removing the second particulate may include a second outlet pipe having a conical interface with the vessel. The system with the means for collecting and removing the third particulate may be a third outlet pipe having a conical interface with the vessel. The system may have the first average specific gravity being larger than the second average specific gravity. The system may have the first average specific gravity as being larger than the third average specific gravity. The system disclosed may have the second average size being larger than the first average size. The system disclosed may have the second average size being larger than the third average size.

Another embodiment of the invention may include an apparatus for use in a drilling operation comprising a horizontal pressure vessel with a first end and a second end connected by a substantially cylindrical middle portion, a first inlet pipe attached to the first end of the pressure vessel, a second inlet pipe attached to the top of the pressure vessel, a first outlet pipe attached to the second end of the pressure vessel, a second outlet pipe attached to the bottom of the pressure vessel, a third outlet pipe attached to the bottom of the pressure vessel, a fourth outlet pipe attached to the bottom of the pressure vessel, a first baffle located within the pressure vessel, wherein the first baffle is in between the second outlet pipe and the third outlet pipe, a second baffle located within the pressure vessel, wherein the second baffle is in between the third outlet pipe and the fourth outlet pipe, and a vent located on the top of the pressure vessel.

A variation of the apparatus may include the first baffle containing a plurality of through holes of a first diameter and a first pitch. The apparatus may have the second baffle containing a plurality of through holes of a second diameter and a second pitch. The apparatus may have the first diameter being different from the second diameter. The apparatus may have the first pitch being different from the second pitch. The apparatus may further comprise a first funnel connecting the first outlet pipe to the vessel. The apparatus may further comprise a second funnel connecting the second outlet pipe to the vessel. The apparatus may further comprise a third funnel connecting the third outlet pipe to the vessel. The apparatus may also include the first inlet pipe entering the vessel horizontally and then turning ninety degrees downward such that the exit of the first inlet pipe is pointing at the bottom of the vessel. Another variation may include a diverter located inside the vessel and connected to the second end.

Another embodiment of the invention may include a method for separating particulates from drilling fluid comprising conveying drilling fluid into a horizontal pressurized vessel, maintaining a preset pressure level within the vessel, maintaining a preset fluid level within the vessel, separating substantially all of the particulate from the drilling fluid, removing the substantially all of the particulate from the vessel in a continuous operation, and removing the drilling fluid from the pressurized vessel in a continuous operation.

Another variation of the embodiments disclosed may include the fluid level being maintained by conveying water into the vessel. A variation could include the particulate being separated into at least three groups of particulate. A variation could include the separated particulate being collected in at least one or more portions of the vessel. Another variation may include flowing the drilling fluid through a first baffle, wherein the baffle is a vertical plate with plurality of flowing through holes of a first diameter. The method may further comprise flowing the drilling fluid through a second baffle, wherein the second baffle is a vertical plate with a plurality of flowing through holes of a second diameter.

DETAILED DESCRIPTION OF EXAMPLES OF THE INVENTION

Figure 1:
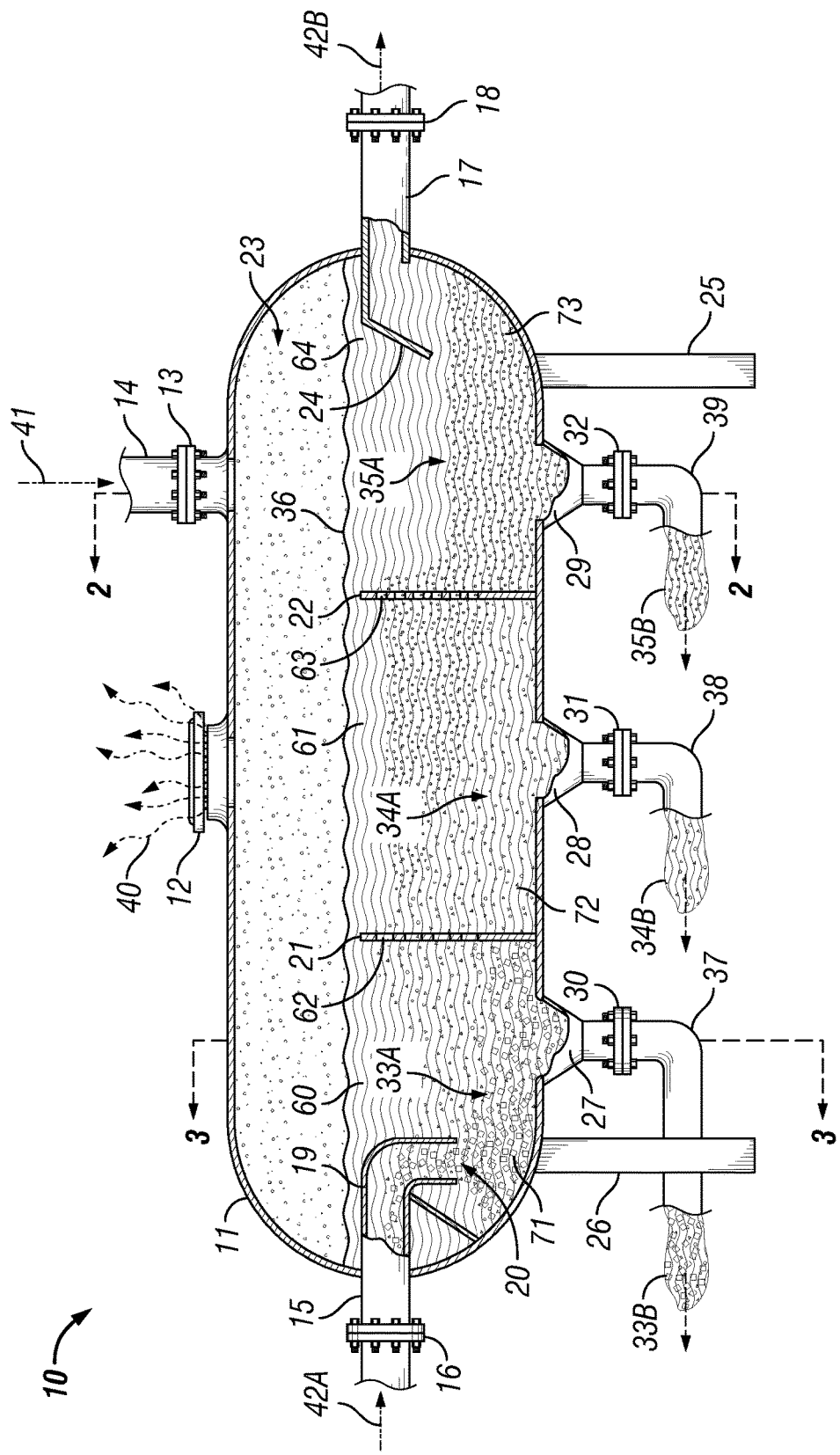
FIG. 1 is a diagram of the vessel showing the flow of drilling fluid and the separation of the different particulates within the drilling fluid.

Referring now to FIG. 1, a separator system 10 comprising a vessel 11, an inlet pipe 15, a first outlet pipe 37, a second outlet pipe 38, a third outlet pipe 39, and a fourth outlet pipe 17. The vessel 11 further comprises a second inlet pipe 14 and a vent 12. Within the vessel there is a first baffle 21 and a second baffle 22. There is a first flow diverter 19 and a second flow diverter 24. The bottom of the vessel 11 has a first collection funnel 27, a second collection funnel 2, and a third collection funnel 29. The vessel 11 may be physically supported by one or more supports, including the first support 26 and a second support 25 as depicted in FIG. 1.

The separator system 10 works by receiving used drilling fluid 42A that enters the vessel 11 via inlet pipe 15 where it is directed downward by the flow diverter 19. The drilling fluid 42A entering the vessel 11 contains barite 71, cuttings 72, bentonite 73 suspended or carried within water 20. The drilling fluid 42A enters the vessel 11 at the first inlet pipe 15, referred to in FIG. 1 as 33A while it is within the first portion 60 of the vessel 11. The drilling fluid 34A is located within the second portion 61 of the vessel 11. The drilling fluid 3A is located within the third portion 64 of the vessel 11. The drilling fluid 42B exits the vessel via the outlet pipe 17.

The separator system 10 maintains the fluid level 4 at a substantially constant height. The fluids 33A, 34A and 3A contain gases 23 that will leave the drilling fluid 33A, 34A, or 3A and pressurize the vessel 11. The pressure of the gas is controlled by a vent 12 that selectively vents off excess gas 40 in order to regulate the pressure within the vessel 11. Extra fluid, in this embodiment makeup fluid 41, is pumped into the vessel via inlet 14 in order to maintain the fluid level 4.

The drilling fluid 33A being received within the first portion 60 of the vessel 11 contains water 20, barite 71, cuttings 72, and bentonite 73. The barite, 71, being heavier than the other particulates within the fluid will precipitate out of the water faster than other components and settle into the bottom of the vessel 11 within the first portion 60. Barite 71 has a higher specific gravity than either the cuttings 72 or bentonite 73. The downward momentum imparted to the barite 71 when the drilling fluid 33A enters the first portion 60 of the vessel 11 will overcome fluid forces that may carry the cuttings 72 and the bentonite 73 to the second portion 61. At the bottom of the first portion 60 in vessel 11, the largely barite 71 composition will flow into the funnel 27 whereby it will be removed from the vessel 11. The exit pipe 37 will remove drilling fluid 33B composed primarily of barite. The baffle 21 is a metal plate that separates the first portion 60 of the vessel 11 from the second portion 61. Baffle 21 has a plurality of through holes 62 that are sized such that the barite particulate 33A will have a reduced likelihood of transiting through the baffle 21. This forces the barite particulate 33A to stay within the first portion 60 of the vessel 11. In a variation of the above described embodiment, the through holes 62 have a pitch and diameter that is conducive to preventing the barite 33A from entering the second portion 61 of the vessel 11. The above variation can include a first total number of through holes 62 adapted to aid in reducing the likelihood that the barite 33A enters the second portion 61 of the vessel 11. However some barite may pass through baffle 21. The cuttings, water, and bentonite will still be able to leave the first portion 60 of the vessel and enter into the second portion 61 of the vessel 11.

Once the fluid enters the second portion 61 of the vessel 11 it will be substantially free of barite particulate 71. Fluid 34A is comprised mostly of water, cuttings 72, and bentonite 73. The second baffle 22 has a plurality of through holes 63 that are sized such that cuttings 72 in fluid 34A will not likely pass through the second baffle 22. Cuttings 72, are physically larger and have a slightly higher specific gravity than bentonite 73. Moreover, the baffle will slow the cuttings 72 down, forcing substantially all of the cuttings 72 to remain within the second portion 61 of the vessel 11. In a variation of the above described embodiment, the through holes 63 have a pitch and diameter that is conducive to preventing the cuttings 72 from entering the third portion 64 of the vessel 11. The above variation can include a second total number of through holes 63 adapted to aid in inhibiting the barite 34A from entering the third portion 64 of the vessel 11. The number of holes in baffle 21 may be different from the number of holes in baffle 22. The pitch and diameter of the through holes 62 in baffle 21 may be larger than the pitch and diameter of the through holes 63 in baffle 22.

The cuttings 72 will likely precipitate to the bottom the second portion 61 of the vessel 11. The cuttings 34A will be collected by the funnel 2 whereby the cuttings 72 will then be removed from the vessel 11 via exit pipe 38 in recovered fluid 34B. The drilling fluid 34A will continue onto the third portion 64 of the vessel 11 as drilling fluid 3A.

When the drilling fluid 3A enters the third portion 64 of the vessel 11 it will be substantially free of barite 71 and cuttings 72. The second baffle 22 having effectively limited the content of the drilling fluid 3A to bentonite 73 and other small particulates. The flow diverter 24 acts to force the drilling fluid 42 downward and then upward into exit pipe 17. This action imparts a downward momentum into the bentonite 73 within the drilling fluid 42. Once the drilling fluid 42 is redirected upwards, the majority of the remaining particulate should precipitate out of the drilling fluid 42 and flow to the bottom of the vessel 11. The bentonite 73 is then collected by funnel 29 and exits the vessel 11 using exit pipe 39. The combined effects of removing substantially all of the barite 33A, cuttings 34A, and bentonite 3A from the primary drilling fluid 42 flow path, plus the addition of makeup fluid 41 into the vessel, results in drilling fluid 42B being substantially free of particulates versus the initial drilling fluid 42A.

The venting of gas 40 is controlled by either an operator and/or a controller according to an algorithm based on, but not limited to, the measured pressure within the vessel 11. The addition of makeup fluid 41 into the vessel is controlled by either an operator and/or a controller according to an algorithm based on, but not limited to, the measured height 4 of the fluid 42 within the vessel 11.

Figure 2:
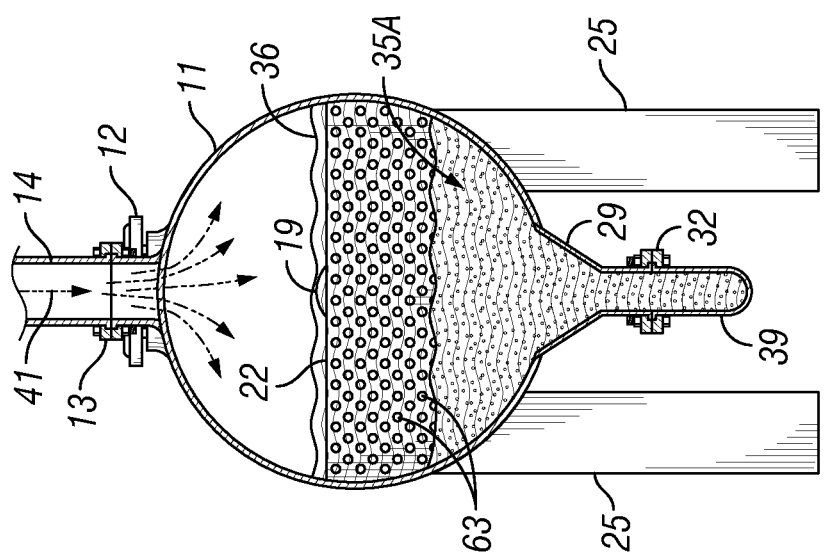
FIG. 2 is a diagram of the cross section of the separation vessel.

FIG. 2 depicts a cross section of the third portion 64 of the vessel 11. FIG. 2 shows the third exit pipe 39, the makeup fluid 41 being added to the vessel 11 by way of inlet pipe 14. The cross section shows one face of the baffle 22 with the plurality of through holes 63. The through holes are only on part of the baffle 22 as there are no holes below the plate at a minimum hole height, which is adapted to allow for separation of the cuttings 72 from the bentonite 73. Below the minimum hole height 64, the baffle 22 is solid metal plate.

Figure 3:
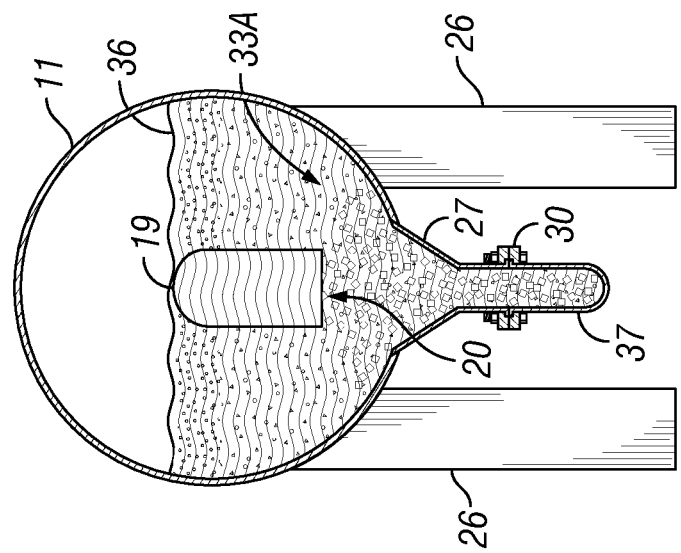
FIG. 3 is a second diagram of the cross section of the separation vessel.

FIG. 3 depicts a cross section of the first portion 60 of the vessel 11. FIG. 3 shows drilling fluid 33A entering into the vessel 11 after going through the diverter 19 whereby a downward momentum is introduced to the drilling fluid 42 and hence momentum is also imparted into the particulates within drilling fluid 33A. Because of baffle 21 and the tendency for larger, heavier particulates to precipitate out of the drilling fluid 42 first, barite 71 primarily precipitates to the bottom of the vessel 11 where it is collected by funnel 27. The barite 71 then leaves the vessel 11 via exit pipe 37.

Figure 4:
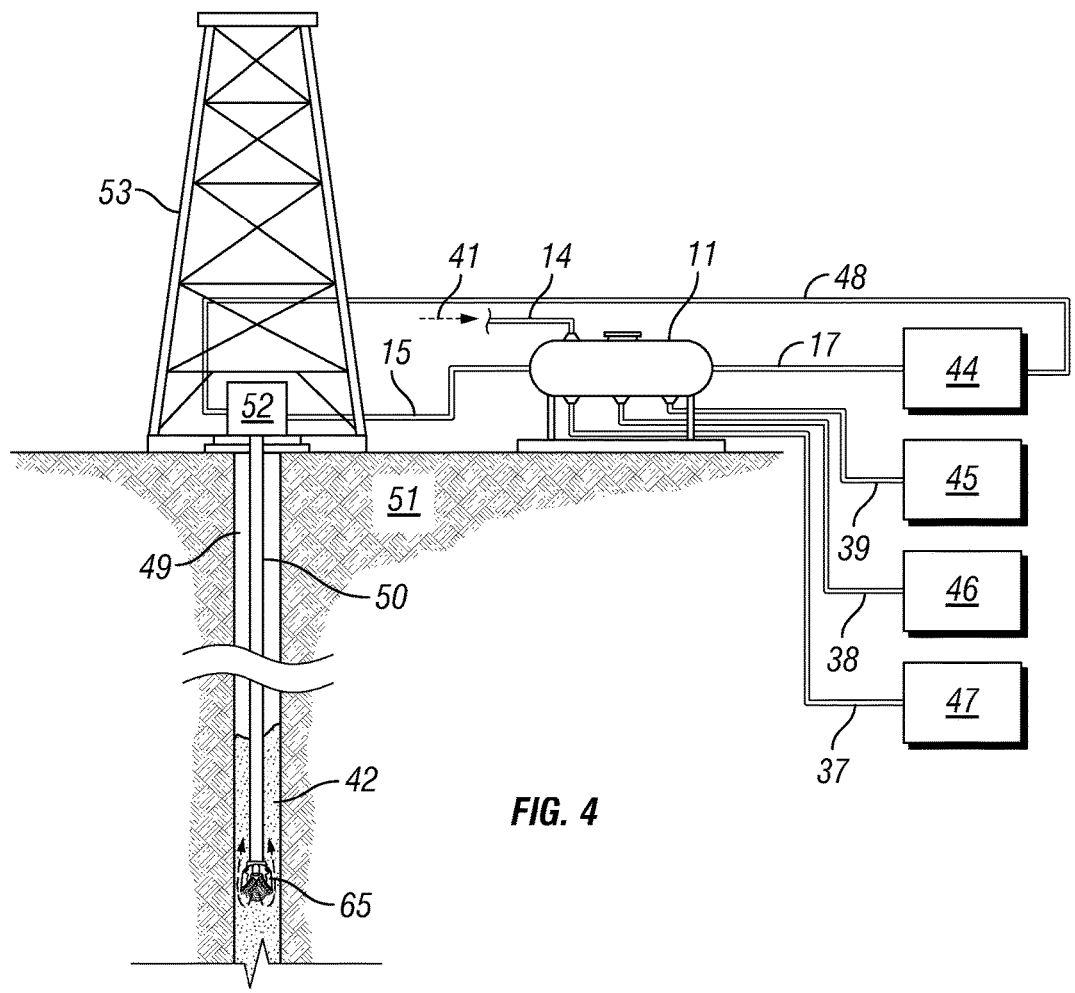
FIG. 4 is a diagram of a drilling rig connected to the separation vessel.

FIG. 4 depicts the overall drilling system wherein a drilling rig 15 is performing a drilling operation into the formation 51. The drill stem 50 is being used to deliver drilling fluid 42 downhole to operate a drill 65 within the borehole 49. Cuttings 72 are created by the drill 65 as it penetrates the formation 51. The drilling fluid 42 both powers the drill 65 and carries the cuttings 72 back to the surface. After powering drill 65 the drilling fluid 42 enters the borehole 49 from the head of the drill 65. The drilling fluid 42 then introduces barite and bentonite into the formation 51 while carrying cuttings 72 to the surface at the wellhead 14. The used drilling fluid 42A is pumped from the blowout preventer 14 or other similar wellhead device to the separator vessel 11 via piping 15. The three exits from the vessel 11 that carry away the particulates include pipe 37 carrying predominantly barite, pipe 38 carrying predominantly cuttings, and pipe 39 carrying predominantly bentonite. Pipe 17 carries away the drilling fluid 42B that is substantially free of particulate versus the drilling fluid 42A that originally entered the vessel 11. The barite 71 is collected in either a tank or a pit whereby it can be placed into storage 47. The barite in storage 47 can either be returned to the barite supplying company for recycling or it can be reused within the current drilling operation whereby it is mixed with drilling fluid 42A and pumped back down the drill pipe 50.

The cuttings 72 are collected in either a tank or a pit whereby it can be placed into storage 46. The cuttings 72 in storage 46 can be combined with solid materials from a fracking operation and then processed through a slagging rotary kiln.

The bentonite 73 is collected in storage device 7. The bentonite 73 in the storage device 7 can be returned to the bentonite 73 supplying company for recycling. The bentonite 73 can also be reused in the current drilling operation whereby it is combined with drilling fluid 42 and pumped back down the drill pipe 50.

The drilling fluid 42B exiting the vessel in pipe 17 is largely composed of water and contains less particulates compared to drilling fluid 42A. Drilling fluid 42B can be reused in the drilling operation by combining it with drilling fluid 42 and pumped down drill pipe 50. The drilling fluid 42B can also be used in part as the makeup fluid 41 entering the vessel 11 via inlet pipe 14. The drilling fluid 42B can also be stored, for example in a tank or pit, where it can be used as needed for further oilfield operations.

In the embodiments discussed herein, the fluid can be flowed through the vessel 11 by a variety of means. One example is the flowrate is maintained by net positive suction head on the outlets 37, 38, and 39. The net positive suction head on each outlet 37, 38, and 39 may be adjusted individually in order to maintain the pressure within vessel 11 and maintain a desired flow rate within the vessel 11.

In the embodiments discussed herein, the fluid level 4 may be maintained at a set height within the vessel 11. The fluid level 4 may be higher than the height baffle 21 and/or baffle 22. The fluid level 4 may be controlled in conjunction with controlling the flow rate as described herein such that the desired separation of particulates is achieved.

In the embodiments disclosed, a variation of the embodiments may include using this application in an offshore environment. A potential benefit would include recycling the water and drilling materials recovered for continued use in drilling. Another benefit would be to aid in clean disposal of the drilling materials in order to comply with laws governing offshore drilling.

It should be kept in mind that the previously described embodiments are only presented by way of example and should not be construed as limiting the inventive concept to any particular physical configuration. Changes will occur to those of skill in the art from the present description without departing from the spirit and the scope of this invention. Each element or step recited in any of the following claims is to be understood as including all equivalent elements or steps. The claims cover the invention as broadly as legally possible in whatever form it may be utilized. Equivalents to the inventions described in the claims are also intended to be within the fair scope of the claims. All patents, patent applications, and other documents identified herein are incorporated herein by reference for all purposes.

What is claimed is:

1. A method for separating by specific gravity barite, drill cuttings, and bentonite from an aqueous drilling fluid comprising barite, drill cuttings, and bentonite recovered from use in drilling a well penetrating a hydrocarbon bearing subterranean formation, the method comprising:

directing from the well the drilling fluid comprising barite, cuttings, and bentonite into a closed pressure vessel positioned horizontally and generally proximate to or near the well, the vessel having a top, an elongated shape, an end proximal the well and an end distal the well, and comprising an inlet port at the proximal end of the vessel, first, second, and third outlet ports serially distributed along the length of the vessel bottom, a vent at the vessel top, and a fourth outlet port at the distal end of the vessel, such that the fluid can flow through the vessel and such that the vessel can be pressurized by gas;

allowing said fluid to flow through the vessel from the inlet port to the first, second, and third outlet ports such that a substantial amount of the barite separates out by specific gravity and exits from the first outlet port, a substantial amount of the cuttings separate out by specific gravity and exit from the second outlet port, and a substantial amount of the bentonite separates out by specific gravity and exits from the third outlet port.

2. The method of claim 1 wherein the drilling fluid comprises hydrocarbon gas and during the flow of the drilling fluid through the vessel, hydrocarbon gas released from the drilling fluid into the vessel exits from the vent in the vessel.

3. The method of claim 1 further comprising allowing the drilling fluid to exit the fourth outlet port of the vessel and reusing the drilling fluid exiting the fourth outlet port in further drilling the well.

4. The method of claim 1 wherein the flow from the well through the vessel is continuous.

5. The method of claim 1 wherein the gas pressure in the vessel is regulated.

6. The method of claim 1 wherein the vessel further comprises a first baffle between the first outlet port and the second outlet port and a second baffle between the second outlet port and the third outlet port.

7. The method of claim 6 wherein the first baffle comprises a plurality of first holes sized to resist passage of barite through the first holes and the second baffle comprises a plurality of second holes sized to resist passage of cuttings through the second holes.

8. The method of claim 7 wherein the first baffle and the second baffle are positioned perpendicular to the outlet ports and generally across at least a portion of the interior of the vessel such that the fluid moves through the baffles in flowing from the inlet port to the fourth outlet port.

9. The method of claim 6 wherein the vessel further comprises a flow diverter between the second baffle and the outlet port for diverting bentonite away from the fourth outlet port and toward the third outlet port.

10. A method of specific gravity separation of barite, drill cuttings and bentonite from a drilling fluid comprising barite, drill cuttings and bentonite and recovered from use in drilling a well penetrating a hydrocarbon bearing subterranean formation, the method comprising:

continuously directing from the well the drilling fluid comprising barite, drill cuttings, and bentonite into a pressurized, horizontal vessel having opposing ends, a top, and a bottom extending the length of the vessel, such that the fluid has a level in the vessel and can flow through the length of the vessel, the vessel further comprising: an inlet port at one end of the vessel; first, second, and third outlet ports serially distributed along the bottom length of the vessel; a vent at the top of the vessel; a fourth outlet port at the opposing end of the vessel; a first baffle positioned in the flow path of the fluid between the first outlet port and the second outlet port and having a plurality of first holes sized to resist passage of barite through the first holes; a second baffle positioned in the flow path of the fluid between the second outlet port and the third outlet port and having a plurality of second holes sized to resist passage of drill cuttings through the second holes; and a fluid diverter for directing bentonite from the fourth outlet port and toward the third outlet port;

allowing the drilling fluid to flow continuously through the vessel from the one end of the vessel to the opposing end of the vessel and out the opposing end of the vessel, while maintaining the fluid level in the vessel, regulating pressure within the vessel, and allowing barite to separate out from the drilling fluid by specific gravity and exit the vessel at the first outlet port, allowing drill cuttings to separate out from the drilling fluid by specific gravity and exit the vessel at the second outlet port, and allowing bentonite to separate out from the drilling fluid and exit the vessel at the third outlet port.

11. The method of claim 10 further comprising recycling barite from the first outlet port, bentonite from the third outlet port, and drilling fluid from the fourth outlet port.

12. The method of claim 1 wherein the drilling fluid has a level in the vessel and that fluid level in the vessel is maintained at a constant level when the fluid flows through the vessel.

* * * * *